May 20, 1947. L. A. CAMEROTA 2,420,813
MULTI-PLATEN PRESS AND LOADING MEANS THEREFOR
Filed Feb. 16, 1943 10 Sheets-Sheet 1

INVENTOR:
Louis A. Camerota
BY
ATTORNEYS.

May 20, 1947.  L. A. CAMEROTA  2,420,813

MULTI-PLATEN PRESS AND LOADING MEANS THEREFOR

Filed Feb. 16, 1943  10 Sheets-Sheet 9

WITNESSES:
Thomas W. Kerr, Jr.
Hubert Fuchs

INVENTOR:
Louis A. Camerota,
BY Paul & Paul
ATTORNEYS.

Patented May 20, 1947

2,420,813

UNITED STATES PATENT OFFICE 2,420,813

MULTIPLATEN PRESS AND LOADING MEANS THEREFOR

Louis A. Camerota, Burlington, N. J., assignor to Florence Pipe Foundry & Machine Company, Florence, N. J., a corporation of New Jersey Application February 16, 1943, Serial No. 476,047

6 Claims. (Cl. 18—16)

This invention relates to multi-platen presses and loading means therefor, and has reference more particularly to presses designed for operation upon materials in sheet form, such for example as slabs of cardboard pulp or of plastic compositions.

My invention has for its chief aim to expedite pressing operations of the kind referred to, i. e., to enable rapid loading and unloading of the presses without danger of injury to the materials (sheets) incident to transfer between the press and the loading means.

This desideratum is attained in practice as hereinafter more fully disclosed, through provision, in association with a press having multiple platens and means to definitely space the platens as the press is opened, of a loading means characterized by having a rack with a plurality of guides which are spaced from one another by a distance half that of the spacing of the press platens; and further by having actuating mechanism whereby the rack can be first positioned to register alternate guides thereof with the intervals between the press platens for reception of the material acted upon during a previous operation of the press, and subsequently positioned to register the remaining guides thereof with the emptied intervals between the press platens so that unpressed material previously placed in such remaining guides can be transferred to the empty intervals between platens in readiness to be acted upon during the next operation of the press.

In connection with a press organization having the foregoing attributes, it is a further object of my invention to determine through provision of suitable means for the purpose, proper allocation of the material (sheets) relative to the platens during changing of the press as well as relative to the rack guides as the press is unloaded.

Another object of my invention is to enable the use of the actuating mechanism to move the rack to a level different from that occupied by the press for convenience of unloading and loading said rack in turn.

Other objects and attendant advantages will appear from the following detailed description of the attached drawings, wherein

Fig. 7 is a view partly in side elevation and partly in vertical section, with the press open and with the loading means in position to receive the finished sheets from the press.

In Figs. 1–8 my improved press is comprehensively indicated by the letter P; and the loading means associated therewith, by the letter L. The press P, it will be noted, has a substantially oblong base 1 and a similarly configured head 2 which latter is supported at an elevation above said base by four quadrangularly arranged shouldered columns 3. As shown, the diametrically reduced upper and lower ends 3a, 3b of the columns 3 respectively pass through corner bosses on the base 1 and the head 2, and their protruding portions are threaded for application of clamp nuts 5 and 6. Resting on a concrete foundation conventionally represented at 7 is a pair of laterally spaced metallic sills 8 having sockets 9 into which the projecting portions of the lower ends 3b of the columns 3 fit, said sills being anchored by means of stud bolts 10, see Fig. 3. Mounted in the base 1 of the press is a pair of cylinders whereof the plunger pistons 12 are actuated through admission and exhaust, under control of suitable means (not illustrated), of pressure fluid into and from the bottoms of said cylinders through individual connecting pipes 13. Rigidly secured by screw bolts 15 to the tops of the pistons 12 is a table 16 whereof the upper surface is ridged as at 17, the bottom surface of the head 2 of the press being similarly ridged as at 18. The table 16 is guided in its up and down movement through sliding engagement of arcuately-notched relatively adjustable blocks 20 thereon with the columns 3, see Figs. 1 and 5.

Figure 5:
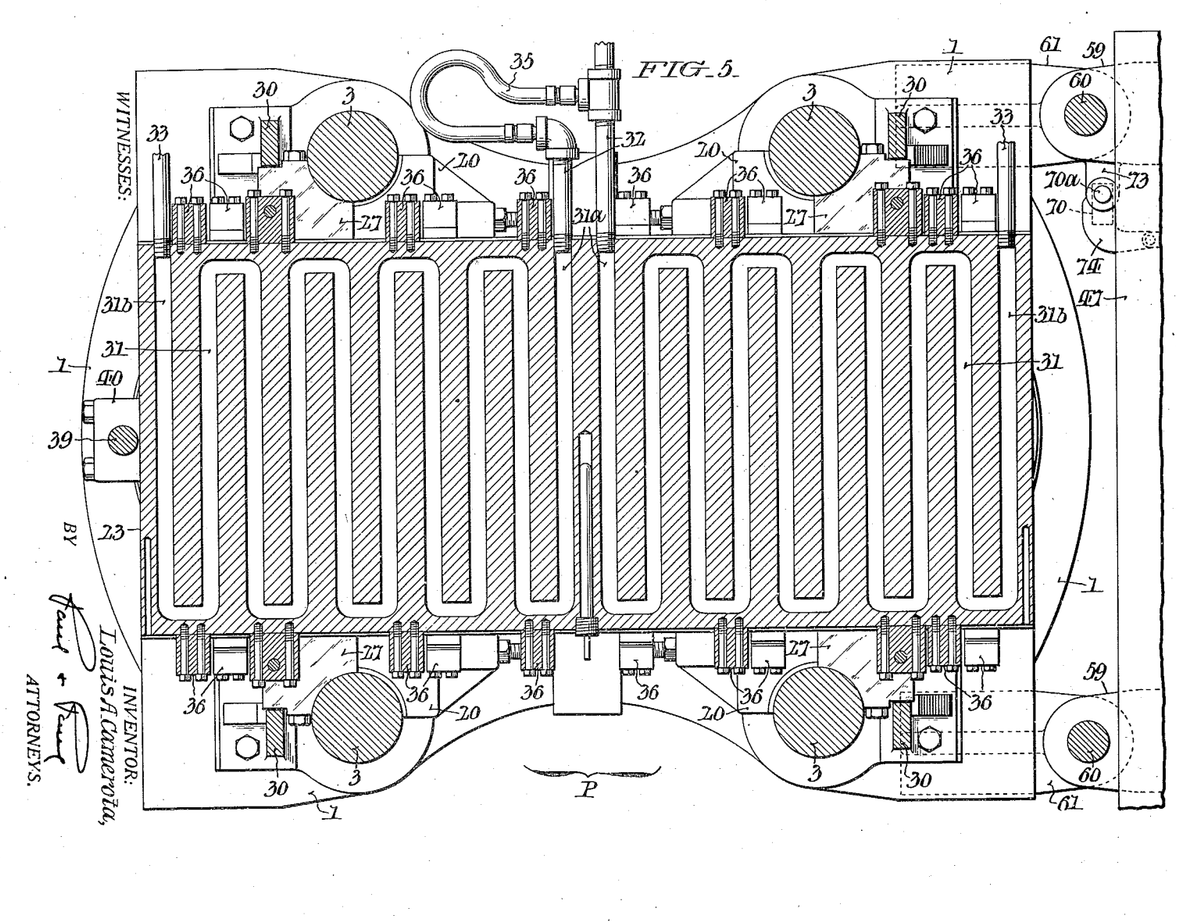
Fig. 5 is a fragmentary view likewise in horizontal section drawn to a larger scale and taken as indicated by the angled arrows V—V in Fig. 1.
Figures 6, 11:
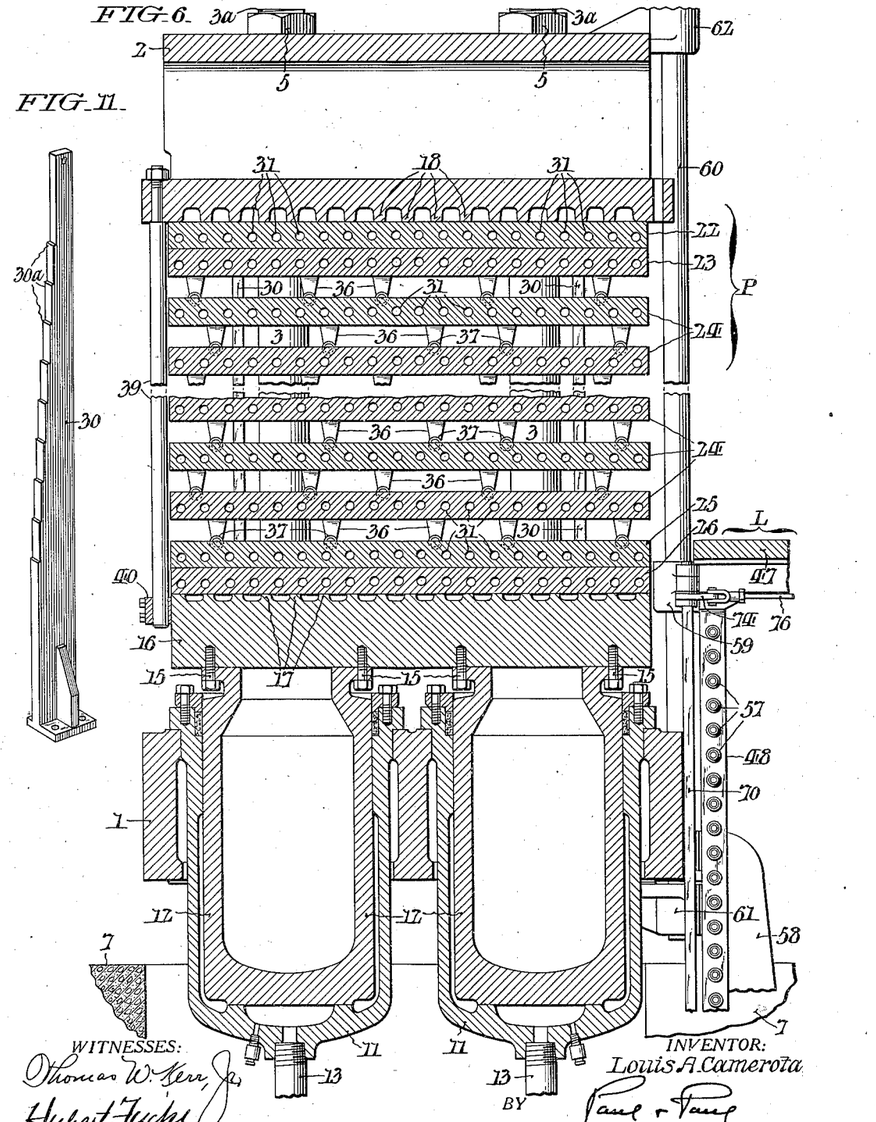
Fig. 6 is a vertical sectional view of the press taken as indicated by the angled arrows VI—VI in Fig. 3.
Fig. 11 is a detail perspective view of a platen-spacing element embodied in the press structure.

Disposed between the head 2 of the press and the table 16 are quadrangular platens 22, 23, 24, 25 and 26, whereof the two upper ones 22 and 23 are bolted or otherwise rigidly secured to the bottom face 18 of said head 2, and the lower ones 25 and 26 similarly rigidly secured to said table 16. The intermediate platens 24 are confined to vertical movement in the press by attached arcuately-notched guide blocks 27 which slidingly engage the columns 3 like the blocks 20 on the table 16. At each side of the press is a pair of laterally spaced flat vertical posts 30 which at their upper and lower ends are bolted fast respectively to the base 1 and head 2, the inner edges of said posts being slightly inclined inwardly and downwardly and formed at uniformly spaced intervals with rest shoulders 30a, see Figs. 3 and 11, for engagement by lateral portions of differential length on the guide blocks 27 carried by the intermediate platens 24. Thus, as the table 16 is lowered through exhausting of the cylinders 12, the intermediate platens 24, in following suit, successively engage the respective shoulders 30a of the posts 30 which thus act as a means for definitely spacing the said platens when the press is opened for reception of the material which is to be pressed. The platens 22—26 are all of hollow construction as shown in Figs. 5 and 6, that is to say, each is internally formed, at opposite sides of its transverse median, with serpentine channels 31 for flow of a temperature modifying fluid which may be either hot or cold depending upon the nature of the material to be pressed. The fluid enters the contiguous inlet ends 31a of the channels 31 by way of individual pipes 32, and passes from the outlet ends 31b of said channels by way of individual pipes 33. As further shown in Fig. 5, the inlet pipes 32 are coupled by means of a loop tube 35. In practice the pipes 32 and 33 of the several platens 22—26 are respectively connected, through flexible tubing (not illustrated), to flow and return mains in communication with a supply source of the fluid.

Figure 10:
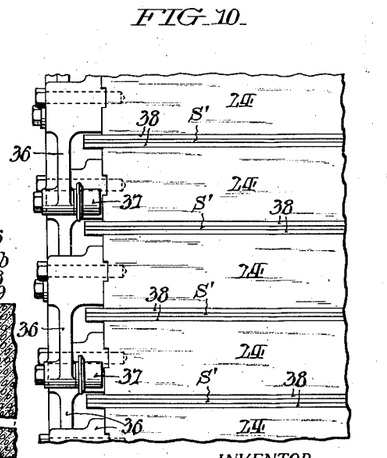

Bolted to the platens 23 and 24 at intervals along their opposite side edges are pendent arms 36, each carrying a roller 37. When the press is open as shown in Fig. 6, the horizontal group of the rollers 37 on each of the platens 23 and 24 serves to support the sheets or slabs S and S' slightly above the top of the platen immediately below during unloading and loading of the press, see Figs. 7 and 8. In the illustrated instance the slabs or sheets S and S' are interposed individually between metallic protecting plates 38. As shown, the roller arms 36 on one platen are staggered relative to the roller arms on the adjacent platen so as not to interfere with each other when the press is closed as in Fig. 10. Incident to insertion of the slabs S into the press from the right in Fig. 8, the leading edges of the protecting plates 38 encounter a vertical stop rod 39 located centrally of the press, see Fig. 3, said rod having its upper end secured in the head 2 and its lower end slidingly engaged in a guide 40 on the table 16. The stop rod 39 thus serves as a means for definitely allocating the slabs in the press.

The loading device L includes a rack 45 with vertically spaced rectangular bottom and top plates 46 and 47 connected at their opposite side edges by laterally spaced uprights 48. The actuating means for the rack comprises a pair of vertical hydraulic cylinders 49 which are arranged centrally of opposite sides of the rack 45, and which have their bases 50 secured by stud bolts 51 to a platform 52 of the concrete foundation 7 at a level below that occupied by the press P. Operative within the cylinders 49 are hollow plungers 53 whereof the upper ends are secured to the top plate 47 of the rack 45, pressure fluid being supplied to and exhausted from the bottoms of said cylinders through pipes 55. Suitable means (not shown) are in practice provided for controlling admission and discharge of the pressure fluid to and from the cylinders 49, so that the rack 45 can be moved from the full line low position to the broken line high position in Fig. 1. Vertically spaced on the side uprights 48 on the rack 45 by a distance equal to half that between the platens of the press when the press is open, are freely revolvable rollers 57, each horizontal set of such rollers constituting a guide means for the slabs or sheets S and S' and their protecting plates in a manner readily shown in Figs. 1, 7 and 8. The vertical movements of the rack 45 are stabilized through engagement of slide brackets 58 and 59 respectively secured to the bottom and top plates 46 and 47 of said rack at its inner end, with fixed guide rods 60 at the front of the press P, said guide rods being secured at their lower and upper ends in brackets 61 and 62 projecting from the base 1 and the head 2 of the press P, see Figs. 1 and 4. In addition, the rack 45 is provided at opposite sides (see Figs. 2 and 4) with rollers 63 which freely revolve in brackets 64 on the bottom plate 46 of said rack and engage longitudinal guide tracks 65 on the cylinders 49.

Figure 4:
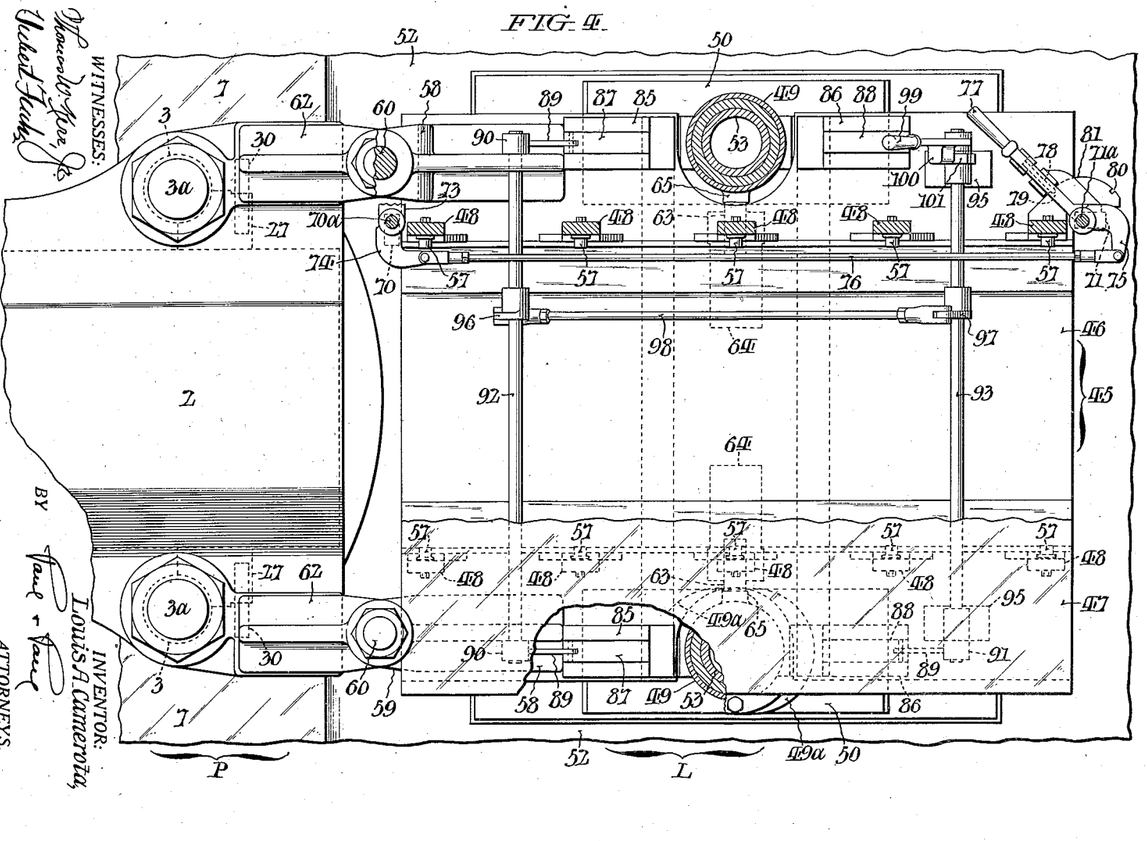
Fig. 4 is a fragmentary view in horizontal section taken as indicated by the angled arrows IV—IV in Fig. 1.
Figure 13:
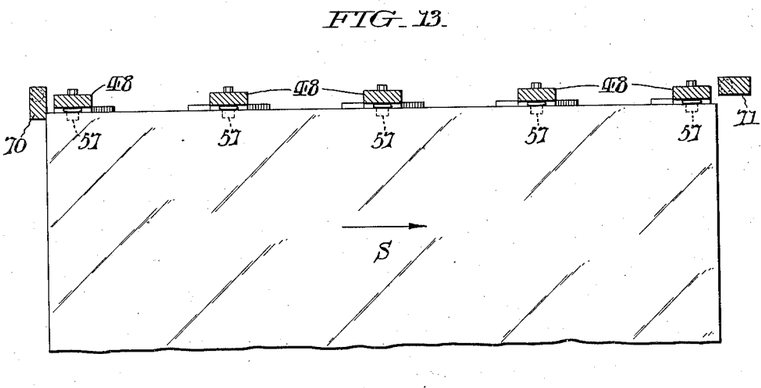
Fig. 13 is a fragmentary diagrammatic view in plan taken as indicated by the angled arrows XIII—XIII in Fig. 1 showing the means for allocating the sheets in the rack of the loading means.

While the press P is closed and compressing one batch of the slabs or sheets, the rack 45 of the loading means L is loaded at the lower level 52, the uncompressed slabs S and their protecting plates 38 being inserted from right to left and rested upon alternate horizontal groups of the rollers 57, the intervening horizontal groups of said rollers being left without charges for a reason which will presently appear. In order to insure proper positioning of the slabs S in the rack 45 during such loading, as well as during subsequent unloading of the press, I have provided stop means which includes two vertical bars 70 and 71 of rectangular cross section with offset pivot trunnions 70a and 71a, top and bottom, which are journaled in bearings 72 and 73 respectively at adjacent side corners of said rack. Affixed to the upper trunnions 70a and 71a of the stop bars 70 and 71 are angular arms 74 and 75 which are coupled by means of a horizontal link rod 76; and secured to the bar 71 intermediate its ends is a manipulating handle 77 which carries a retractable latch 78 for cooperation with notches 79 and 80 in a sector 81 affixed to one of the uprights 48 at the outer end of the rack 45. It is to be particularly observed from Fig. 4 that the coupling of the arms 74 and 75 is such that, as the stop bar 70 is moved into action, the other stop bar 71 is retracted, and vice versa. Thus when the rack is to be loaded on the lower platform 52 of the foundation 7, the stops 70 and 71 are respectively moved to the active and the retracted positions in which they are shown in Figs. 4 and 13. Accordingly, as the unpressed charges S are slid into the rack 45 from the right in Figs. 4 and 13, the leading edges of the protecting plates 38 will encounter the actively positioned stops 70 and be thereby properly positioned within the confines of the rack.

Figure 14:
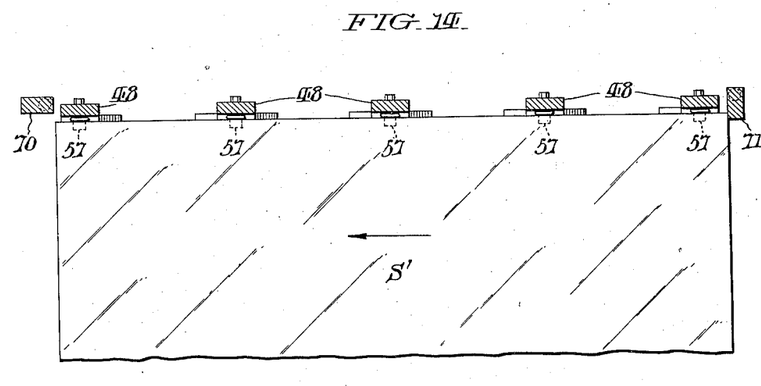
Fig. 14 is a view like Fig. 13 with the stops shifted for proper allocation of the finished sheets in the rack during their transfer from the press to said rack.

After loading of the rack 45 at the lower level 52 of the foundation 7, it is first elevated by operation of the cylinders 49 to the position in which it is shown in Fig. 7, so that its alternate empty horizontal rollers 57 come in line with the intervals between neighboring platens of the press P, which latter has in the meantime been opened for transfer of the pressed charges S' to said rack. The last mentioned position of the rack is determined through engagement of its lower plate 46 with the undersides of the circumferential top flanges 49a of the cylinders 49 as also shown in Fig. 7. Before unloading of the press as just explained, the stops 70 and 71 are moved to the positions in which they are shown in Fig. 14 for subsequent reception of the compressed charges S' transferred from the press to the rack to insure the proper positioning of such charges in the latter.

Figures 1, 12:
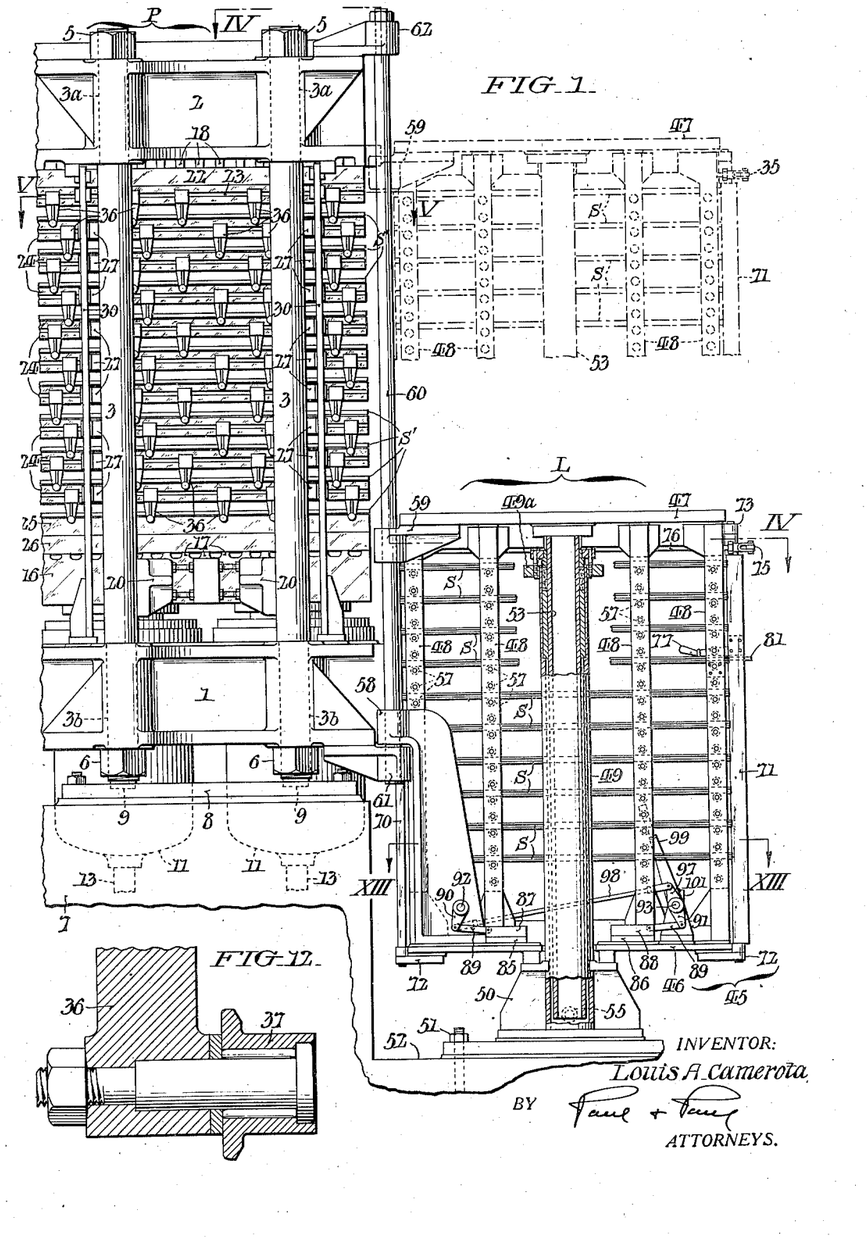
Fig. 1 is a view in side elevation of my improved press and its loading means, certain portions of the latter means being shown in section for exposure of important structural details.
Fig. 12 is a fragmentary detail sectional view taken as indicated by the angled arrows XII—XII in Fig. 7.
Figure 1:
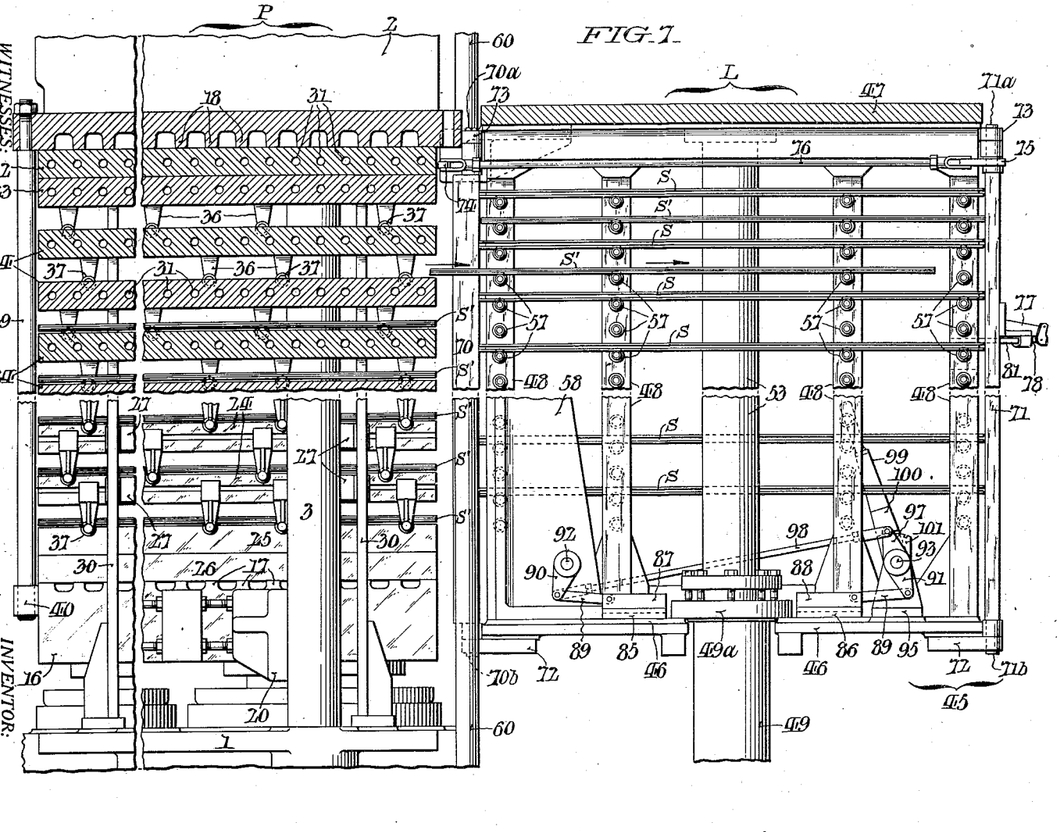
Figure 2:
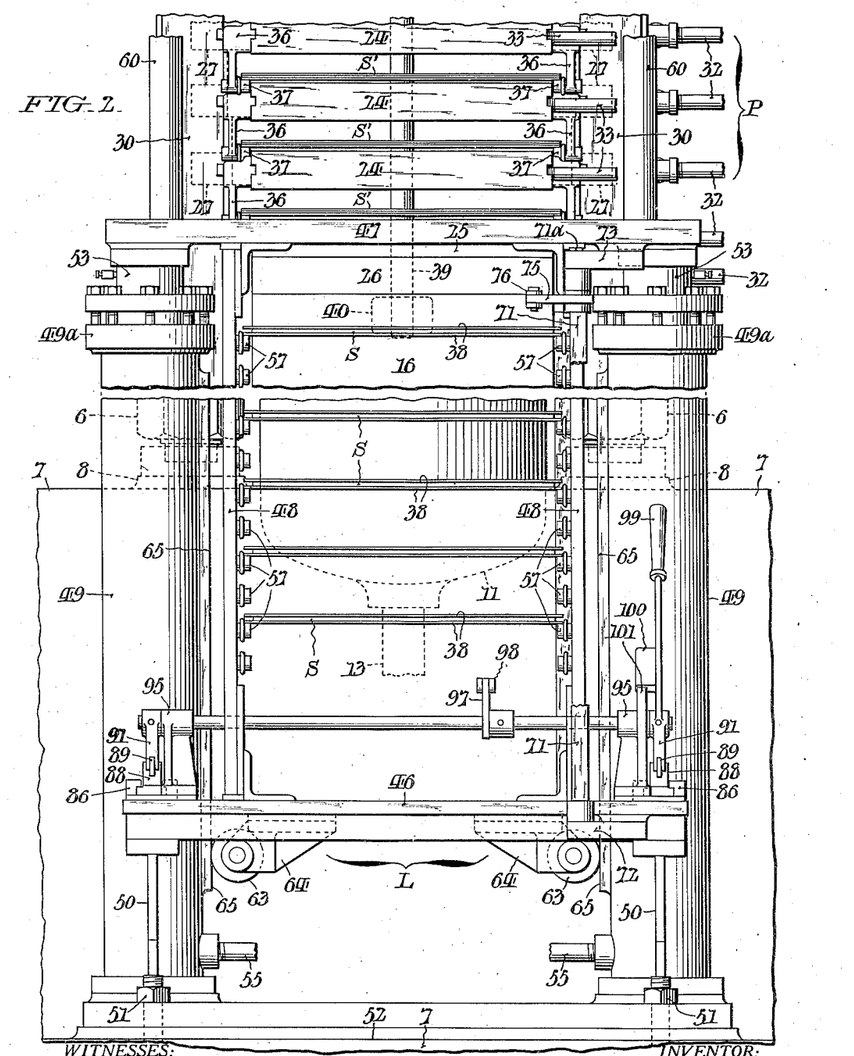
Fig. 2 is a broken out view of the organization showing the same in front elevation.
Figure 3:
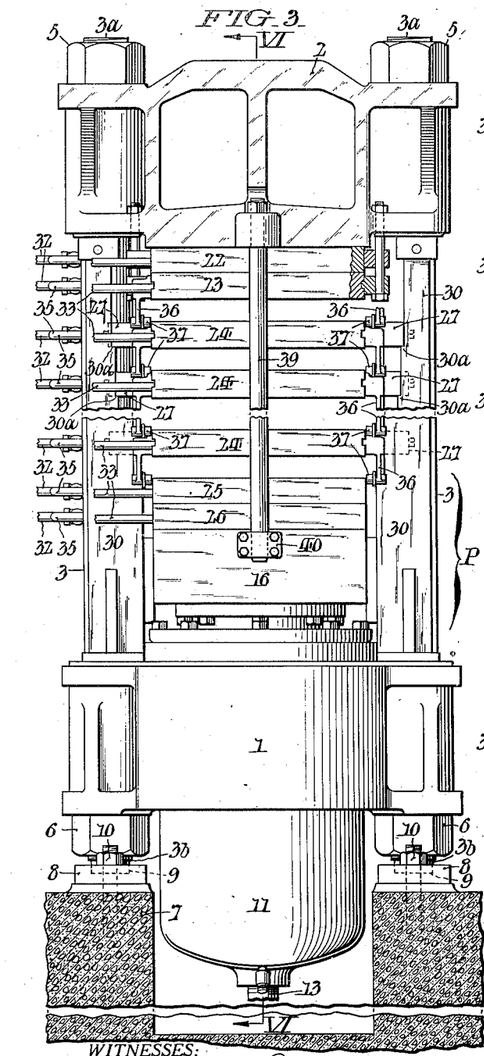
Fig. 3 is a view like Fig. 2 showing the rear elevation of the press.
Figure 8:
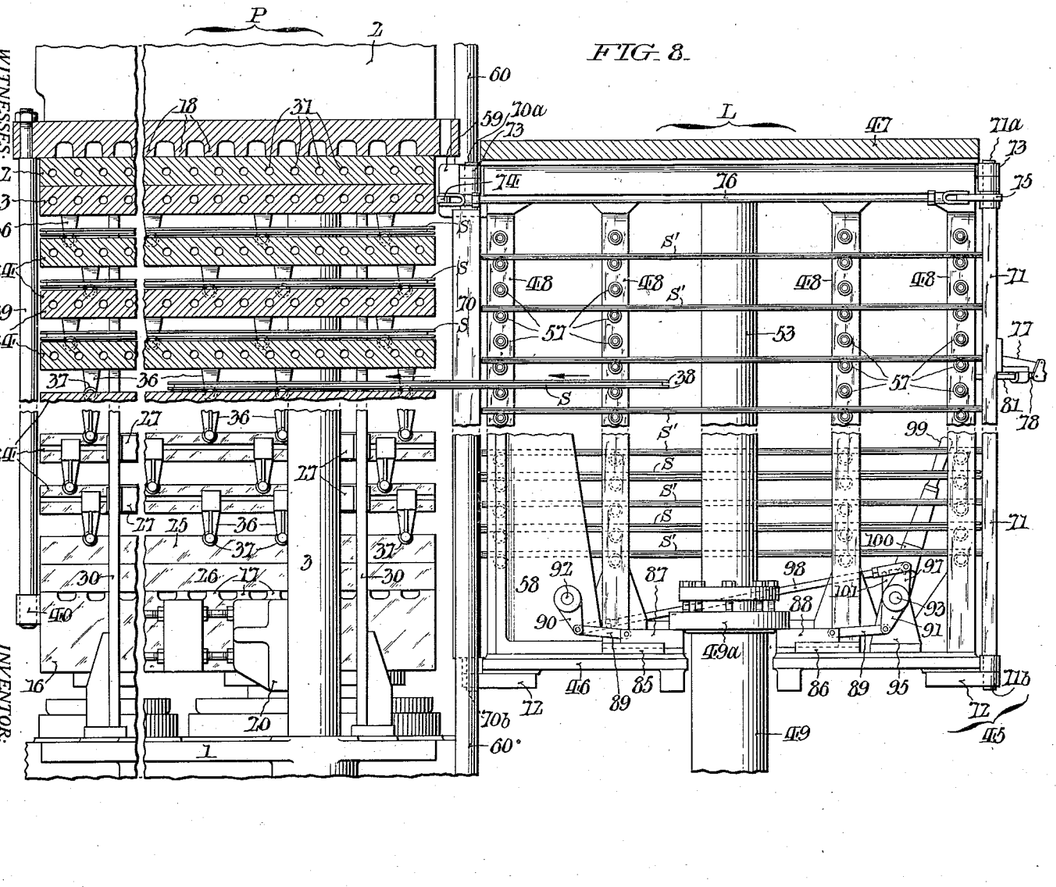
Fig. 8 is a view similar to Fig. 7 with the loading means differently positioned in readiness for the transfer of unpressed sheets into the previously emptied intervals between the press platens.
Figure 9:
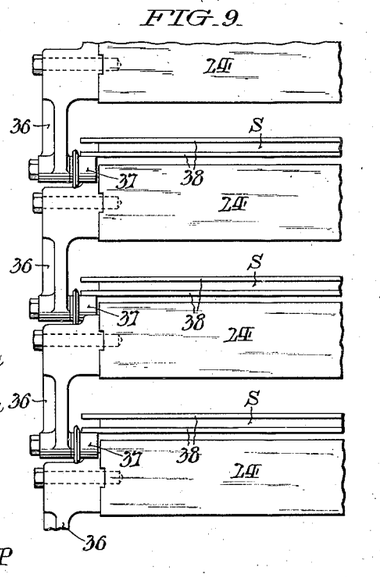
Figs. 9 and 10 are fragmentary detail views corresponding to Figs. 3 and 4 drawn to a larger scale and respectively showing the press in open and closed positions.

After the press P is completely unloaded, the rack 45 is slightly lowered to the position of Fig. 8 so that the unpressed charges S on the horizontal sets of guide rollers 57 will then come directly opposite the intervals between the platens of the open press. With this accomplished, the stops 70, previously withdrawn as in Figs. 8 and 14, will allow transfer of the new unpressed charges S from the rack 45 to the press P. The latter positioning of the rack is effected through movement by the cylinders 49, and determined with the aid of the additional means about to be described. Oppositely slidable in guides 85 and 86 on the lower plate 46 of the rack at opposite sides of the latter are pairs of blocks 87 and 88 which are respectively coupled, by means of links 89, with pendent arms 90 and 91 at the ends of a pair of transverse shafts 92 and 93. As shown, the shaft 92 has journal support in the brackets 58, 59 hereinbefore mentioned, and the shaft 93 in bearing brackets 95 secured to the bottom plate 46 of said rack. Intermediate their ends, the shafts 92 and 93 also have attached to them, respectively, pendent and upwardly projecting arms 96 and 97, which are coupled by a link rod 98. To one end of the shaft 93 is moreover secured a manipulating handle 99 with a retractable latch 100 to cooperate with notches in a sector 101 affixed to one of the brackets 95. Normally, the stops are retracted as shown in Figs. 1, 4 and 7.

From the foregoing it will be seen that I have provided a press and an associated loading means which are operable in such a way as to not only reduce manual labor to a minimum but enable rapid loading and unloading so that little time is lost between pressings. In the treatment of plastics it is important for attainment of uniformity in the finish, that the slabs be all subjected to the same temperature. It is for this reason that the extra or inactive platens 22 and 26 are interposed between the upper and lowermost active platens 23 and 25 and the head 2 and base 1 respectively of the press, and that said head and base are ribbed as at 18 and 17 to prevent thermal loss from said upper and lowermost active platens through the press framework.

Figure 15:
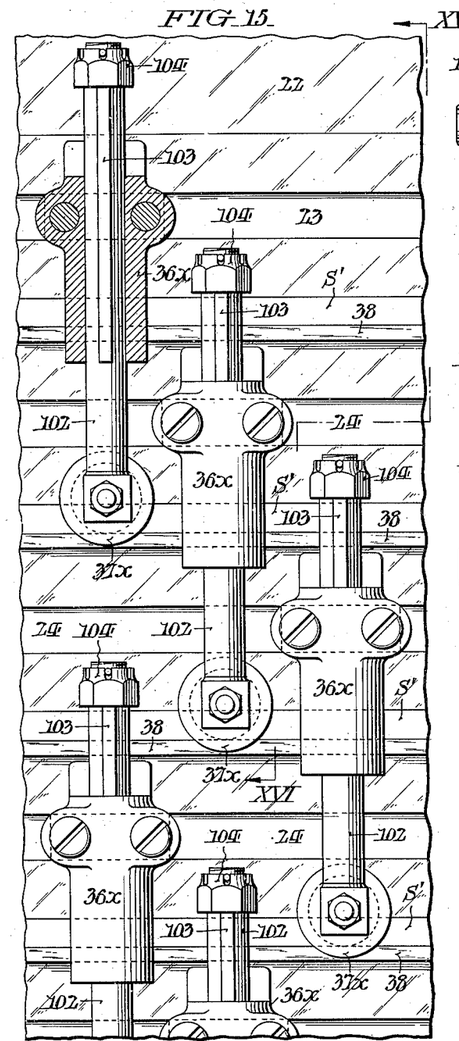
Fig. 15 is a fragmentary view in side elevation corresponding to Fig. 1 showing an alternative form of my invention with the press closed.
Figure 16:
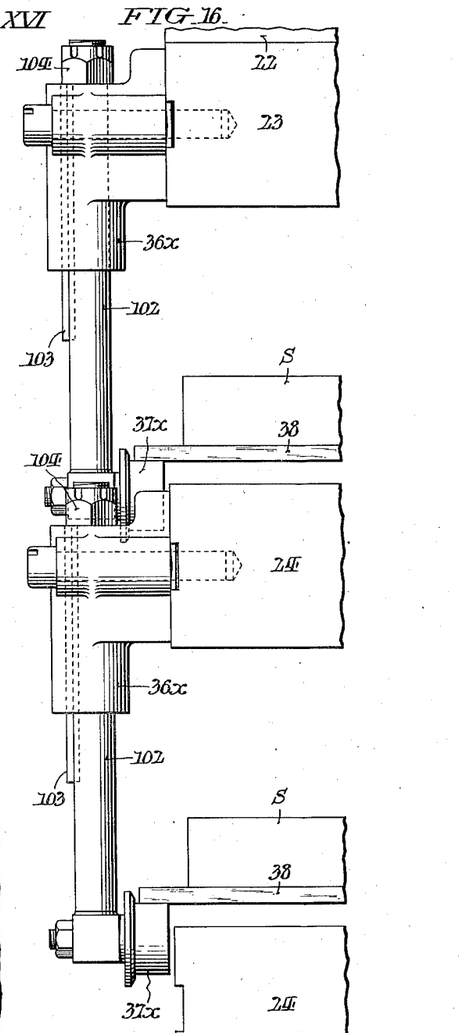
Fig. 16 is a fragmentary view in elevation looking as indicated by the angled arrows XVI—XVI in Fig. 15 with the press open.

In the modification shown in Figs. 15 and 16, the rollers 37x whereby the sheets or slabs S and S' are sustained clear of the platens 24 while the press is open and being loaded or unloaded are suspended on rods 102 which are axially slidable in guide brackets 36x but restrained against rotation in the latter by feathers or keys 103. As shown, the rods 102 and their mountings are staggeringly arranged like the roller arms 36 of the first described embodiment. The drop of the rods 102 as the press is opened is limited by engagement of nuts 104 at their upper ends with the tops of the brackets 36x. The modified arrangement just described is advantageous in instances where relatively thick slabs or sheets S are to be compressed and where the platens of the press must of necessity be separated by a greater distance than in the first illustrated embodiment of my invention. As the press is closed in Fig. 15, it will be observed that the rollers 37x carried by one platen are engaged by the protecting plate 38 (of which only one is employed in this instance) of the slab or sheet S' on the platen immediately below, and pushed up as a consequence of the ability of its supporting rod 102 to slide in the corresponding bracket 36x, so as not to interfere with press closing.

Having thus described my invention, I claim:

1. In a press of the character described for compressing materials in slab form, a plurality of superposed platens capable of being moved toward or away from each other; means for definitely spacing the platens when the press is opened; and fixed stop means providing a continuous vertical surface to intercept the slabs as they are inserted edgewise between the platens incident to loading of the press for the purpose of definitely positioning them in the press.

2. The invention according to claim 1, wherein the stop means is in the form of a vertical rod centrally of one side of the press.

3. In a press of the character described for compressing materials in slab form, having a fixed top platen, a bottom platen movable relative to the top platen, and intermediate platens free for movement toward and away from each other, the press being unobstructed at one side for loading purposes; fixed stop means at the opposite side of the press providing a continuous vertical surface to intercept the slabs as they are inserted into the press for the purpose of definitely positioning them relative to the platens; means for definitely spacing the intermediate platens relative to each other and to said top and bottom platens when the press is opened, including upright members with steps at different levels arranged at an inclination to the vertical for engagement by projections of different lengths at opposite lateral edges of said intermediate platens.

4. Loading and unloading mechanism designed for use with a press such as defined in claim 1, including a rack with plural rows of guide rollers spaced by a distance equal to half the spacing of the platens when the press is open; actuating means including a pressure-fluid cylinder for positioning the rack to register alternate rows of the guide rollers with the intervals between the platens so that the slabs acted upon during a previous operation of the press can be transferred laterally from the press to such rows, and for subsequently positioning the rack to register the intervening rows of the guide rollers with the intervals between the platens so that unpressed slabs previously placed on such intervening rows can be transferred laterally into the intervals between platens in readiness to be compressed; and selective motion-limiting stops to determine the two positions of the rack, said stops being carried by the rack and being cooperative with a projection on the cylinder aforesaid.

5. Loading and unloading mechanism for use with a press such as defined in claim 1, including a rack with plural rows of guide rollers spaced by a distance equal to half the spacing of the platens when the press is open; actuating means for positioning the rack to register alternate rows of the guide rollers with the intervals between the platens so that the slabs acted upon during a previous operation can be transferred laterally from the press to such rows, and for subsequent positioning the rack to register the intervening rows of the guide rollers with the intervals between the platens so that unpressed slabs previously placed on such intervening rows can be transferred laterally into the intervals between platens in readiness to be compressed; and selectively usable stop means for intercepting the slabs during unloading of the press and charging of the rack comprising vertically pivoted bars at the front and rear corners of the rack, and actuating means whereby the respective bars can be alternately swung respectively from retracted to active positions and vice versa to intercept the slabs during unloading of the press and charging of the rack.

6. In a press of the character described for compressing materials in slab form, a plurality of superposed platens capable of movement toward or away from each other; means for definitely spacing the platens when the press is opened; and means for temporarily sustaining the slabs in the intervals between platens to facilitate their placement or removal from the press comprising guide brackets disposed at intervals along opposite side edges of the top and intermediate platens and staggered as between neighboring platens, and vertical rods axially slidable but restrained against rotation in the individual guide brackets, said rods having horizontal axis rollers at their lower ends for supporting the slabs at opposite edges and stops at their upper ends to cooperate with the tops of the brackets to limit downward movement of the rods when the press is opened.

LOUIS A. CAMEROTA.

REFERENCES CITED

The following references are of record in the file of this patent:

UNITED STATES PATENTS

| Number | Name | Date |
|---|---|---|
| 652,313 | Seiberling | July 2, 1900 |
| 1,232,022 | Gammeter | July 3, 1917 |
| 1,291,637 | Burkhardt | Jan. 14, 1919 |
| 1,332,457 | Burkhardt | Mar. 2, 1920 |
| 1,951,999 | Sprague | Mar. 20, 1934 |

FOREIGN PATENTS

| Number | Country | Date |
|---|---|---|
| 433,778 | Great Britain | Aug. 15, 1935 |